United States Patent
Bejanin et al.

(10) Patent No.: US 10,557,039 B2
(45) Date of Patent: Feb. 11, 2020

(54) COMPOSITIONS COMPRISING BISPHOSPHONIC COMPOUNDS DISSOLVED IN A FLUORINATED SOLVENT, AND USE THEREOF FOR COVERING THE SURFACE OF A PART

(71) Applicant: Surfactis Technologies, Angers (FR)

(72) Inventors: Stéphane Bejanin, Paris (FR); David Portet, Briollay (FR)

(73) Assignee: Surfactis Technologies (FR)

( * ) Notice: Subject to any disclaimer, the term of this patent is extended or adjusted under 35 U.S.C. 154(b) by 0 days.

(21) Appl. No.: 16/078,466

(22) PCT Filed: Feb. 21, 2017

(86) PCT No.: PCT/EP2017/053959
§ 371 (c)(1),
(2) Date: Aug. 21, 2018

(87) PCT Pub. No.: WO2017/144480
PCT Pub. Date: Aug. 31, 2017

(65) Prior Publication Data
US 2019/0048204 A1 Feb. 14, 2019

(30) Foreign Application Priority Data

Feb. 22, 2016 (FR) ..................... 16 51442

(51) Int. Cl.
| | | |
|---|---|---|
| C09D 5/00 | (2006.01) | |
| B05D 1/28 | (2006.01) | |
| B05D 5/00 | (2006.01) | |
| C09D 127/12 | (2006.01) | |
| C23C 22/03 | (2006.01) | |
| B05D 1/02 | (2006.01) | |
| C23C 22/02 | (2006.01) | |
| B05D 5/08 | (2006.01) | |
| B05D 1/30 | (2006.01) | |
| B05D 1/18 | (2006.01) | |
| C09D 127/16 | (2006.01) | |
| G04B 31/08 | (2006.01) | |
| C09D 7/20 | (2018.01) | |
| C08K 5/5337 | (2006.01) | |

(52) U.S. Cl.
CPC ................. *C09D 5/00* (2013.01); *B05D 1/02* (2013.01); *B05D 1/18* (2013.01); *B05D 1/28* (2013.01); *B05D 1/30* (2013.01); *B05D 5/00* (2013.01); *B05D 5/08* (2013.01); *C09D 7/20* (2018.01); *C09D 127/12* (2013.01); *C09D 127/16* (2013.01); *C23C 22/02* (2013.01); *C23C 22/03* (2013.01); *G04B 31/08* (2013.01); *C08K 5/5337* (2013.01)

(58) Field of Classification Search
CPC .......... C09D 5/00; C09D 7/20; C09D 127/12; C09D 127/14; C09D 127/16; C23C 22/02; C23C 22/03; B05D 1/00; B05D 1/02; B05D 1/18; B05D 1/28; B05D 1/30; B05D 5/00; B05D 5/08
See application file for complete search history.

(56) References Cited

U.S. PATENT DOCUMENTS

2013/0287955 A1* 10/2013 Portet .................. C10M 105/04
427/318
2015/0103639 A1 4/2015 Portet et al.

FOREIGN PATENT DOCUMENTS

| EP | 2054165 A2 | 5/2009 |
|---|---|---|
| FR | 2904784 A1 | 2/2008 |
| WO | 2008017721 A2 | 2/2008 |
| WO | 2012085130 A1 | 6/2012 |
| WO | 2013167624 A1 | 11/2013 |

OTHER PUBLICATIONS

International Search Report for Application No. PCT/EP2017/053959, dated Mar. 23, 2017, pp. 1-2.

* cited by examiner

*Primary Examiner* — William P Fletcher, III
(74) *Attorney, Agent, or Firm* — Lerner, David, Littenberg, Krumholz & Mentlik, LLP

(57) ABSTRACT

A liquid composition comprising at least one bisphosphonic compound bearing at least one partially fluorinated, perfluorinated (PF) or perfluorpolether (PFPE) group. The bisphosphonic compound is dissolved in at least one non-flammable fluorinated solvent or in a mixture of non-flammable fluorinated solvents. A method for increasing the lipophobic or hydrophobic properties of a surface is also disclosed, wherein a liquid composition comprising at least one bisphosphonic compound bearing at least one partially fluorinated, perfluorinated (PF) or perfluorpolether (PFPE) group is applied to the surface. The method may include preliminary oxidation of the surface, if necessary; contacting the surface with the liquid composition until the bisphosphonic compound contained therein is assembled in a layer coating the surface; and drying the surface thus coated.

16 Claims, No Drawings

COMPOSITIONS COMPRISING BISPHOSPHONIC COMPOUNDS DISSOLVED IN A FLUORINATED SOLVENT, AND USE THEREOF FOR COVERING THE SURFACE OF A PART

CROSS-REFERENCE TO RELATED APPLICATIONS

The present application is a national phase entry under 35 U.S.C. § 371 of International Application No. PCT/EP2017/053959, filed Feb. 21, 2017, which claims priority from French Patent Application No. 1651442, filed Feb. 22, 2016, all of which are incorporated herein by reference.

SUMMARY

The present invention concerns liquid compositions based on at least one bisphosphonic compound bearing at least one fluorinated, perfluorinated or perfluoropolyether group, dissolved in at least one non-flammable fluorinated solvent, the use of these compositions to increase the lipophobic properties and limit the spreading of lubricants and hydrocarbons on a treated surface and/or to increase the hydrophobic properties and limit the spreading of aqueous solutions on a surface to be treated.

The present invention also relates to a process for coating the surface of a part with a functionalisation layer using one of the above-mentioned compositions.

Lastly, the present invention includes the functionalised parts obtained by implementing the process of the invention and more particularly parts of mechanisms or devices integrated in a watch piece, in a micromechanical, fluidic, electronic, optical or optronic item, and in measurement systems.

DESCRIPTION OF THE INVENTION

It is known that bisphosphonic compounds bearing a partially fluorinated, perfluorinated (PF) or perfluoropolyether (PFPE) group deposited in a monolayer modify wettability properties and make the surfaces they coat hydrophobic and lipophobic (FR 2904784 and EP 2054165). These compounds are capable of binding as self-assembling monolayers on mineral or metallic materials such as ruby, sapphire, iron, titanium, copper, aluminium, nickel, tin or on metal alloys such as steel, stainless steel, brass, copper-nickel-zinc, bronze, tin-nickel, nickel-phosphorus, copper-beryllium. However, in solvents such as alcoholic solvents, these molecules have only a limited affinity for materials in a reduced oxidation or slightly oxidised state, for instance certain polymers such as polycarbonate, polymethylmethacrylate and polyoxymethylene, and certain noble metals such as gold, silver and rhodium.

However, the solvents hitherto proposed for dissolving fluorinated BP compounds were aqueous or alcoholic solvents, aldehydes, ketones, ethers, alkanes, naphthas or a mixture thereof (cf. EP 2054165, WO 2013/167624, WO 2012/085130).

The amount of fluorinated BP compounds used in the coating solutions of the prior art was about 1 mM (cf. EP 2054165, WO 2013/167624, WO 2012/085130).

The contact time between the fluorinated BP compounds and the surfaces to be treated was systematically more than 5 minutes (WO 2013/167624, WO 2012/085130), even up to 3 hours on certain substrates (cf. EP 2054165).

Consequently, it was known in the prior art that, to make a surface hydrophobic or oleophobic using fluorinated BP compounds, it was necessary to use large amounts of BP-PF or BP-PFPE compounds, and/or to leave the coating solution in contact with the surface to be treated for a relatively long time.

Accordingly, it was not possible to use these solutions in high-speed automated systems and/or in applications requiring the coating solution to be sprayed (in micromotor manufacturing plants, for example).

Furthermore, a drying or dehydration step was often necessary to facilitate solvent evaporation (cf. EP 2054165, WO 2013/167624, WO 2012/085130), and the temperature of these processes was not necessarily compatible with all surface types (thermoplastic materials, for example).

In this context, the present Inventors sought to identify a faster method of surface functionalisation making it possible to provide long-lasting hydrophobic and lipophobic properties to surfaces made of any material, in particular glass, ruby, polymers and slightly oxidised metals, in a very short time (less than 1 minute), and using a restricted amount of functionalisation compounds.

The present Inventors identified that this need could be met by using a solution containing partially fluorinated bisphosphonic compounds that have been dissolved in a non-flammable fluorinated solvent, and not in an alcoholic or aqueous solvent as previously proposed.

The method and the composition described in the present application provide the following advantages over the state of the art:

They are effective on all metallic materials such as iron, titanium, copper, aluminium, nickel, tin or on metal alloys such as steel, carbon steel, stainless steel, brass, copper-nickel-zinc, bronze, tin-nickel, nickel-phosphorus, copper-beryllium (examples 1 to 15 below).

They are effective for mineral and ceramic materials like ruby (examples 2, 5, 10, 11 below).

They are effective on materials in a reduced oxidation or slightly oxidised state such as certain noble metals, in particular gold, silver and rhodium (examples 3, 5, 6, 8, 14 below).

They are effective for the treatment of composites and of thermoplastic and thermosetting polymers, on hybrid materials such as plastoferrite (examples 12, 13, 15 below).

The surface treatment is very fast relative to that described in the prior art with bisphosphonic compounds bearing a partially fluorinated, perfluorinated (PF) or perfluoropolyether (PFPE) group in solution in an alcohol. Indeed, an immersion of 5 to 30 seconds in the solution of the invention is sufficient to make the treated material hydrophobic and oleophobic, whereas the solutions of the prior art, with equal concentrations of functionalisation compounds, are not effective as quickly (examples 4, 5, 6 below).

Treating surfaces requires no heating step.

The surface treatment uses a small amount of fluorinated bisphosphonic compounds bearing a partially fluorinated, perfluorinated (PF) or perfluoropolyether (PFPE) group in the coating solution (examples 6, 7, 12 and 13), whereas the solutions of the prior art require a higher amount of BP compounds to obtain an equivalent coating efficiency (example 6).

The surface treatment is resistant despite small quantities of BP molecules bearing a partially fluorinated, perfluorinated (PF) or perfluoropolyether (PFPE) group and the short contact time with the surface (examples 8 to 11 below).

The application can very easily be carried out by spraying, in particular in an industrial environment, and does not require anti-deflagration industrial facilities (ATEX standard) as with the solutions of the prior art, notably those containing inflammable solvents (an alcohol, for example).

The invention is based on the use of a molecule or a mixture of molecules of bisphosphonic type bearing a partially fluorinated, perfluorinated (PF) or perfluoropolyether (PFPE) group in a non-flammable fluorinated solvent. Such solvents have two attractive features within the context of the present invention: they do not have a flash point and the evaporation rate of the solvent on a treated part is very fast, generally less than 60 seconds. The use of such a non-flammable, rapidly evaporating solvent makes it possible to carry out a surface treatment in an industrial context by dipping, spraying or dip coating, flow coating, roll to roll, bar coating, and do not require anti-deflagration equipment (ATEX standard).

The present invention concerns more particularly a liquid composition containing at least one bisphosphonic compound bearing at least one partially fluorinated, perfluorinated (PF) or perfluoropolyether (PFPE) group, said bisphosphonic compound being dissolved in at least one non-flammable fluorinated solvent.

Preferably, said composition does not contain functionalisation compounds other than the bisphosphonic compounds of the invention bearing a partially fluorinated, perfluorinated (PF) or perfluoropolyether (PFPE) group.

In the present context, "bisphosphonic compound", "gem-bisphosphonic compound", "bisphosphonic molecule" or "bisphosphonic acid", or "bisphosphonate" means a compound containing at least two $PO_3$ groups attached to the same carbon atom. These groups can be in phosphonate $PO_3^-$ form or in phosphonic acid $PO_3H$ form. Such compounds are described notably in EP 2 054 165.

In the present context, "solvent" means a substance, preferably liquid, which has the property of dissolving or diluting other substances without chemically modifying them and without itself being modified.

In the present context, "fluorinated solvent" means a solvent or mixture of solvents at least one component of which is partially fluorinated or perfluorinated.

In the present context, "non-flammable" or "non-inflammable" means a chemical that does not have a flash point or has a flash point above 60° C.

Preferably, the solvents of the invention include HFCs (hydrofluorocarbons), HFEs (hydrofluoroethers), HFOs (hydrofluoroolefins), PFPEs (perfluoropolyethers).

According to a particular feature of the invention:
the hydrofluorocarbons are preferably hydrofluoro-($C_{3-6}$) alkanes, in particular pentafluorobutane (HFC-365mfc),
the hydrofluoro-ethers are preferably ($C_{1-4}$)alkoxy perfluoro-($C_{4-8}$) alkanes, in particular methoxy-nonafluorobutane (HFE-7100), ethoxy-nonafluorobutane (HFE-7200) and 1,1,1,2,2,3,4,5,5,5-decafluoro-3-methoxy-4-terfluoromethyl-pentane (HFE-7300),
the hydrofluoroolefins are preferably $C_3$ to $C_{10}$ hydrofluoroolefins containing a single ethylenic double bond, in particular methoxy tridecafluoro heptene, and
the perfluoropolyethers are molecules having a $C_2$ to $C_5$ perfluorinated carbon chain interspersed with oxygen atoms, in particular perfluoropropylene oxide polymer.

In the present context, "non-flammable solvent" or "non-inflammable solvent" means a solvent or a mixture of solvents that does not have a flash point or has a flash point above 60° C.

According to an advantageous feature of the invention, said solvent or mixture of solvents also contains non-fluorinated solvents. The presence of non-fluorinated solvent can play the role of co-solvent facilitating the dissolution of the bisphosphonic compound. Advantageously, said non-fluorinated solvent is present in the composition of the invention in an amount ranging from 0.5% to 10%, preferably ranging from 0.5% to 5%, more preferably from 0.5% to 2%. This amount must be low enough not to affect the non-inflammability properties.

Indeed, it is sometimes preferable, in order to facilitate the dissolution of the BP compound in the fluorinated solvent used, to add a small amount of non-fluorinated solvent. This is the case, for example, of compounds A and D presented in example 1. For these particular compounds, the presence of about 1% alcohol in the fluorinated solvent in which they are suspended facilitates their dissolution and thus their use (cf. example 1).

In a particular embodiment of the composition of the invention, said fluorinated solvent is present therein in mixture with an alcohol, such as isopropyl alcohol, the latter being present at a sufficiently low concentration not to affect the non-inflammability properties. Advantageously, said alcohol solvent is present in the composition of the invention in an amount ranging from 0.5% to 10%, preferably ranging from 0.5% to 5%, more preferably from 0.5% to 2%.

According to a particular feature of the invention, said fluorinated solvent, even when it contains alcohol, does not have a flash point or has a flash point above 100° C.

According to a particular feature of the invention, said solvent is a mixture of solvents in the form of a quasi-azeotropic or azeotropic mixture.

According to a feature of the invention, the fluorinated bisphosphonic compound has the following general formula (I):

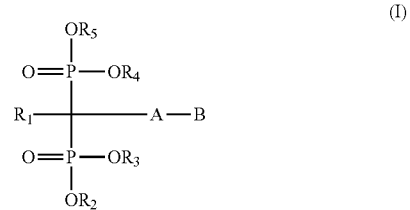

wherein:
$R_2$, $R_3$, $R_4$, $R_5$ independently represent a hydrogen atom or a $C_1$-$C_{10}$ alkyl group, such as methyl or ethyl; preferably $R_2$, $R_3$, $R_4$, $R_5$ are identical and represent a hydrogen atom;
A represents a single chemical bond, —O—, —S— or —NH—, preferably a single chemical bond;
B represents:
a) a linear or branched, saturated or unsaturated $C_1$-$C_{100}$ alkyl chain, which may be perfluorinated or partially fluorinated, and which may be substituted or interrupted by 1 to 10 optionally perfluorinated aryl groups; or
b) a —$(CH_2)_m$—X group wherein m is an integer between 1 and 100 and X is an optionally saturated $C_1$-$C_{100}$ alkyl group, which may be perfluorinated or partially fluorinated, said alkyl group can be substituted or interrupted by 1 to 10 optionally perfluorinated aryl groups;
preferably B represents a perfluorinated or partially fluorinated $C_9$-$C_{20}$ alkyl group; and $R_1$ represents a hydrogen atom or an —OH, —NH$_2$, or $C_1$-$C_{100}$ alkyl group, which may be perfluorinated or partially fluorinated; $R_1$ preferably represents an —OH group, as well as the toxicologically acceptable salts thereof, or the following formula (I'):

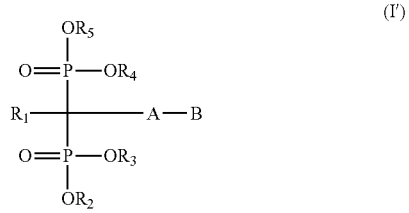

wherein:
B represents a —(CH$_2$)$_m$-D-E group wherein:
m is an integer between 1 and 100,
D is a single chemical bond or an —O—, —S—, —OCO—, —COS—, —SCO—, —SCS—, —CONH—, —HNCO—, —HNCO—CF(CF$_3$)— or —NH—CO—NH—, —NH—CS—NH— group, and
E is an —(O—CF$_2$—CF$_2$)$_n$—OR$_f$, —(O—CF$_2$—CF(CF$_3$))$_n$—OR$_f$, —(O—CF(CF$_3$)—CF$_2$)$_n$—OR$_f$ or —(O—CF$_2$—CF$_2$—CF$_2$)—OR$_f$ group, where n is an integer between 1 and 100 and R$_f$ is a $C_1$-$C_{10}$ perfluorinated alkyl group, or the following group:

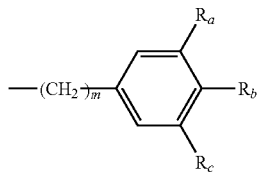

wherein, $R_a$, $R_b$, $R_c$ independently represent a hydrogen atom, a perfluorinated $C_1$-$C_{100}$ alkyl or an —(O—CF$_2$—CF$_2$)$_n$—OR$_f$, —(O—CF$_2$—CF(CF$_3$))$_n$—OR$_f$, —(O—CF(CF$_3$)—CF$_2$)$_n$—OR$_f$ or —(O—CF$_2$—CF$_2$—CF$_2$)$_n$—OR$_f$ group, where n and R$_f$ are as previously defined and m is an integer between 1 and 20,
A represents:
a) a single chemical bond, or
b) an —O—, —S— or —NH— function, and
$R_1$, $R_2$, $R_3$, $R_4$ and $R_5$ are as previously defined, as well as the toxicologically acceptable salts thereof.

All these fluorinated bisphosphonic compounds are, for example, described in patent application no. EP 2 054 165, as is their preparation process.

According to a particular feature of the invention, the fluorinated bisphosphonic compound has the following structural formula:

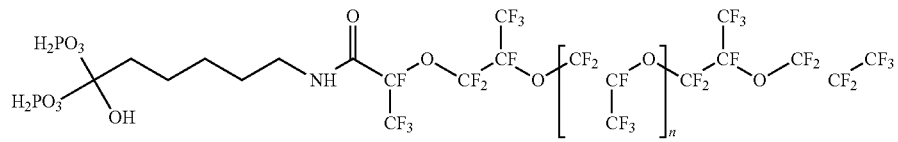

wherein n=1 or n=2.

The "toxicologically acceptable salts" concerned by the present invention are notably sodium or potassium salts, calcium or magnesium salts, or salts formed by suitable organic ligands such as ammonium salts. The salts are therefore preferably selected from sodium, potassium, magnesium, calcium and ammonium salts.

According to another feature of the invention, the fluorinated bisphosphonic compound is present at a molar concentration comprised between 0.01 and 50 mmol/L, preferentially between 0.05 and 5 mmol/L, even more preferentially between 0.05 and 2 mmol/L. It is also possible to use the fluorinated bisphosphonic compound at a concentration comprised between 0.1 and 1 mmol/L, as shown in examples 6 and 7 below.

The invention also concerns the use of the compositions described above to increase the lipophobic properties and limit the spreading of lubricants on a surface, for instance oils.

Another feature of the invention concerns the use of the compositions described above to increase the hydrophobic properties and limit the spreading of aqueous solutions on a surface.

Another feature of the invention also concerns the use of the compositions described above to limit the spreading and binding of hydrocarbons on a surface.

The invention also includes a process for coating the surface of a part with a functionalisation layer in order to improve the hydrophobic, lipophobic and anti-hydrocarbon properties of said surface, characterised in that it comprises the following successive steps:
a) if necessary, preliminary oxidation of the part surface. This step may notably be performed on polymeric materials such as polycarbonate or polyethylene as well as on silicon surfaces in order to increase the reactivity of the surface towards bisphosphonate. Oxidation of the surface may for example be carried out by plasma, corona or UV-ozone treatment,
b) contacting the part surface with a liquid coating composition as described above, until the bisphosphonic compounds contained therein are assembled into a layer coating said surface,
c) drying the part surface thus coated, preferably in ambient air, optionally with a blower.

According to a feature of said process, the contacting of the part surface with said liquid composition is carried out by spraying, spin coating, wiping, dabbing, dipping, dip coating, flow coating, laminar coating.

According to another feature of this coating process, the contacting of the coating composition with the part surface is carried out by dipping the part in a solution containing between 0.001% and 5% (w/w) fluorinated bisphosphonic compounds for a time comprised between 1 second and 10 minutes, at room temperature.

Preferably, the dipping time of the part in the solution is comprised between 1 second and 1 minute, for example between 5 seconds and 30 seconds (inclusive). These times have indeed been successfully tested in the context of the tests presented below (cf. examples 4, 5 and 6).

Preferably, this process contains no heating or dehydration step. More preferably, it is carried out at room temperature.

According to another feature of this coating process, an additional rinsing step is carried out by spraying with or immersion in a solvent and in particular an alcohol or a fluorinated solvent, preferably identical to the solvent present in the liquid coating composition, between step b) and step c) or after step c).

According to another feature of said coating process, said part is a part made of metallic material, in particular based on iron, titanium, copper, aluminium, nickel, tin or an alloy of these metals, in particular steels, carbon steels, 20AP steel, stainless steels, brass, copper-nickel-zinc, bronze, tin-nickel, nickel-phosphorus and beryllium copper.

According to another feature of this coating process, said part is composed of mineral materials and/or ceramics, such as glass, silicon, ruby, sapphire.

According to another feature of this coating process, said part is composed of materials in a reduced oxidation or slightly oxidised state such as certain noble metals, gold, silver, rhodium.

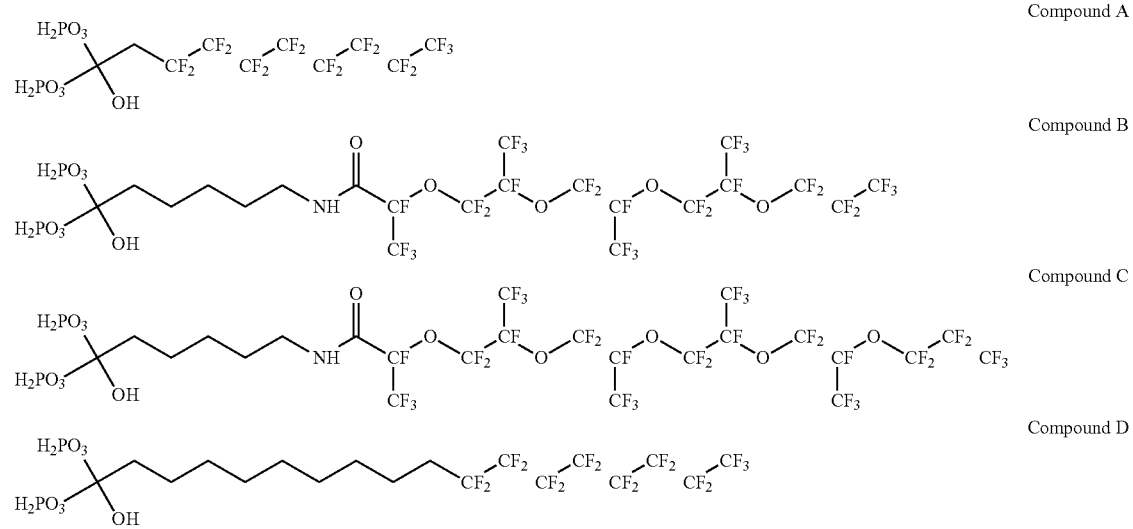

According to another feature of this coating process, said part is composed of composite materials and/or thermoplastic or thermosetting polymers, or a hybrid material such as plastoferrite.

According to a feature of the invention, said part is functionalised and obtainable by implementing said process.

According to another feature of the invention, it is a matter of a part of a mechanism or device integrated in a watch piece, in a micromechanical or mechatronic object, in a medical device, in a printed circuit, in an electronic board, in a microelectronic connector, in a micro- or macrofluidic system, in optical or optronic systems, on measuring instruments.

Surprisingly, compositions of the invention containing bisphosphonic molecules in a non-flammable fluorinated solvent or mixture of solvents do not have the same properties as those obtained with the same bisphosphonic compounds used in a solvent not containing fluorinated solvent. Such formulations make it possible to impart hydrophobic and oleophobic properties on materials that did not initially allow it, such as non-oxidised or slightly oxidised materials such as gold, rhodium, and polymeric, thermoplastic, thermosetting materials.

Also surprisingly, the stability of this coating is enhanced by the very nature of the fluorinated solvent/fluorinated bisphosphonate mixture on these materials, which makes it more resistant to certain washes.

From a process point of view, the savings is also substantial since the coating is grafted quickly, the solvent evaporates quickly and, since the solvent is non-flammable, the composition can be sprayed on the surfaces and used in high-speed, non-ATEX automated systems.

EXAMPLES

Example 1: Coating Metal Parts with Various Hydrophobic and Oleophobic PFPE Bisphosphonic Compounds in a Fluorinated Solvent The molecules described below were dissolved at 0.2 mM in a mixture of fluorinated solvent HFC-365mfc and isopropyl alcohol (IPA) in a volume ratio of 99:1.

The solutions thus prepared were used for surface coating 316L stainless-steel, rhodium, nickel, gold and ruby parts.

Surface modification by the bisphosphonic compounds is evaluated by measuring contact angles (CAs) before and after treatment with the oil Moebius 941 and with hexadecane.

| | CA before treatment | CA after treatment | | | |
|---|---|---|---|---|---|
| | | Compound A | Compound B | Compound C | Compound D |
| Oil | | | | | |
| 316L stainless-steel | 11° ± 0° | 70° ± 0° | 79° ± 2° | 81° ± 2° | 72° ± 4° |
| Rhodium | 12° ± 3° | 66° ± 3° | 83° ± 0° | 71° ± 4° | 62° ± 6° |
| Nickel | 9° ± 0° | 72° ± 2° | 82° ± 0° | 85° ± 1° | 73° ± 0° |
| Ruby | 14° ± 0° | 71° ± 1° | 80° ± 1° | 81° ± 0° | 76° ± 0° |
| Au | 10° ± 2° | 77° ± 0° | 83° ± 0° | 90° ± 3° | 78° ± 1° |

-continued

| | CA before treatment | CA after treatment | | | |
|---|---|---|---|---|---|
| | | Compound A | Compound B | Compound C | Compound D |
| Hexadecane | | | | | |
| 316L stainless-steel | <10° | 59° ± 4° | 71° ± 1° | 80° ± 1° | 62° ± 3° |
| Rhodium | <10° | 65° ± 1° | 74° ± 1° | 86° ± 0° | 64° ± 5° |
| Nickel | <10° | 62° ± 0° | 75° ± 0° | 83° ± 1° | 66° ± 1° |
| Ruby | <10° | 64° ± 1° | 77° ± 0° | 70° ± 2° | 67° ± 6° |
| Au | <10° | 70° ± 0° | 76° ± 0° | 85° ± 1° | 72° ± 1° |

The contact angles are similar regardless of the solution used. The treated surfaces are all oleophobic. All these molecules provide oleophobic and anti-hydrocarbon properties to the treated surfaces.

Molecules B and C, dissolved in fluorinated solvents alone, produced similar surface treatment results.

The other solvents used include:

| Type of fluorinated solvent | Molecular formula | Trade name | Percentage by volume |
|---|---|---|---|
| HFE | $C_4F_9OCH_3$ | HFE-7100 | 100% |
| HFE | $C_4F_9OC_2H_5$ | HFE-7200 | 100% |
| HFO | $C_5F_{11}-CF=CF-OCH_3$ | HFO Vertrel Suprion | 100% |

For compounds such as molecules A and D, the presence of isopropyl alcohol is recommended because it substantially improves solubilisation in these same solvents.

Example 2: Coating Oxidised Metal Parts with a Hydrophobic and Oleophobic PFPE Bisphosphonic Molecule Solubilised in Various Fluorinated Solvents The following table summarises the solvent families used for these solubilisation tests.

| Type of fluorinated solvent | Molecular formula | Trade name | Percentage by volume |
|---|---|---|---|
| HFE | $C_4F_9OCH_3$ | HFE-7100 | 100% |
| HFE | $C_4F_9OC_2H_5$ | HFE-7200 | 100% |
| HFC | $CH_3CF_2CH_2CF_3$ | HFC 365mfc | 99% (+1% isopropyl alcohol) |
| HFO | $C_5F_{11}-CF=CF-OCH_3$ | HFO Vertrel Suprion | 100% |

For each of the solvent/molecule mixtures tested, clarity after dilution and over time was validated.

The various solutions obtained were used to coat various materials as described below.

a. Treatment with Compound C in a Mixture of HFC-365Mfc and Isopropyl Alcohol

Nickel-plated, 316L stainless-steel and 20AP steel parts were treated by the following protocol:

The parts are cleaned with an organic solvent or an aqueous-phase detergent solution and then air dried.

The parts are immersed for 30 seconds in a solution of compound C at 0.2 mM in a mixture of isopropyl alcohol and HFC-365mfc.

The parts are then dried in ambient air.

b. Treatment with Compound C in HFE-7100

Similarly, 316L stainless-steel and 20AP steel parts were treated by the following protocol:

The parts are cleaned with an organic solvent or an aqueous-phase detergent solution and then air dried.

The parts are immersed for 30 seconds in a solution of compound C at concentrations between 0.2 and 5 mM in the solvent HFE-7100.

The parts are taken out and dried in open air.

c. Treatment with Compound C in the Solvent HFE-7200

Similarly, 316L stainless-steel and 20AP steel parts, and rubies were treated by the following protocol:

The parts are cleaned with an organic solvent or an aqueous-phase detergent solution and then air dried.

The parts are immersed for 30 seconds in solutions of compound C at concentrations between 0.2 and 5 mM in the solvent HFE-7200.

The parts are taken out and dried in open air.

d. Treatment with Compound C in the Solvent HFO Vertrel Suprion

Nickel-plated, 316L stainless-steel and 20AP steel parts, and rubies were treated by the following protocol:

The parts are cleaned with an organic solvent or an aqueous-phase detergent solution and then air dried.

The parts are immersed for 30 seconds in a solution of compound C at concentrations between 0.2 and 5 mM in HFO Vertrel Suprion.

The parts are taken out and dried in ambient air

Surface modification by the gem-bisphosphonic compounds is evaluated by measuring the contact angle (CA) with the oil Moebius 941.

| | CA before treatment | CA after treatment | | | |
|---|---|---|---|---|---|
| | | HFC-365mfc + IPA | HFE-7100 | HFE-7200 | HFO Vertrel Suprion |
| Nickel | 9° ± 0° | 85° ± 1° | nr | 86° ± 1° | 85° ± 1° |
| 316L stainless-steel | 11° ± 0° | 81° ± 2° | 68° ± 1° | 84° ± 2° | 84° ± 1° |
| 20AP steel | 12° ± 3° | 78° ± 3° | 73° ± 2° | 85° ± 2° | 82° ± 4° |
| Ruby | 14° ± 0° | 86° ± 2° | nr | nr | 83° ± 2° |

The contact angles are similar regardless of the solution used. The surfaces thus treated are all oleophobic.

Example 3: Coating Non-Oxidised Metal Parts

Gold-plated brass and rhodium-plated brass parts were treated with compound C in solution in various fluorinated solvents according to the protocols described in examples 2.a. to 2.d.

Surface modification by the gem-bisphosphonic compounds is evaluated by measuring the contact angle with a watch oil, Moebius 941.

|  | CA before treatment | CA after treatment | | | |
|---|---|---|---|---|---|
|  |  | HFC 365mfc + IPA | HFE-7100 | HFE-7200 | HFO Vertrel Suprion |
| Gold | 10° ± 2° | 90° ± 3° | 55° ± 1° | 84° ± 1° | 85° ± 1° |
| Rhodium | 12° ± 3° | 71° ± 4° | 79° ± 3° | 84° ± 1° | 85° ± 1° |

The surfaces thus treated are all oleophobic.

Example 4: Influence of the Dipping Time in HFC-365mfc+IPA

Gold-plated brass, rhodium-plated brass, 20AP steel and 316L stainless-steel parts were treated with molecule C in solution in a mixture of alcohol and HFC-365mfc. Three dipping times were tested: 5 seconds, 30 seconds and 5 minutes. The contact angles with a watch oil were measured after treatment.

|  | CA after a dipping of 5 seconds | CA after a dipping of 30 seconds | CA after a dipping of 5 minutes |
|---|---|---|---|
| Gold-plated brass | 81° ± 0° | 82° ± 0° | 85° ± 1° |
| Rhodium-plated brass | 82° ± 1° | 84° ± 1° | 84° ± 1° |
| Ni | 83° ± 0° | 83° ± 1° | 83° ± 1° |
| 316L stainless-steel | 80° ± 0° | 82° ± 0° | 80° ± 1° |

Under the conditions tested, the dipping time has no influence on the quality of the surface coating.

Example 5: Comparison of a Treatment with Compound C Solubilised in Isopropyl Alcohol with Treatments with Compound C Solubilised in Various Fluorinated Solvents Nickel-plated, gold-plated, rhodium-plated, 20AP steel and 316L stainless-steel parts were treated with 0.2 mmol/L solutions of compound C according to the protocols of examples 2.a, 2.c and 2.d. Parts were also treated with compound C in solution in isopropyl alcohol at 2 mmol/L according to the following protocol, commonly used in the watch industry:
- The parts are cleaned with an organic solvent or an aqueous-phase detergent solution and then dried in open air.
- The parts are immersed in the solution of compound C in isopropyl alcohol for 5 minutes.
- The parts are immersed in a beaker of isopropyl alcohol for 60 seconds.
- The parts are taken out and immersed in the solution of compound C in isopropyl alcohol for 5 minutes.
- The parts are taken out and immersed in a beaker of isopropyl alcohol for 60 seconds.
- The parts are drained and dried with hot air.

The contact angles with a watch oil are then measured.

| Solvent | Isopropyl alcohol | HFC-365mfc + IPA | HFO Vertrel Suprion | HFE-7200 |
|---|---|---|---|---|
| Gold | 85° ± 2° | 85° ± 6° | 85° ± 1° | 84° ± 1° |
| Rhodium | 79° ± 3° | 69° ± 5° | 86° ± 1° | 84° ± 1° |
| 20AP steel | 74° ± 1° | 81° ± 4° | 82° ± 2° | 85° ± 1° |
| 316L stainless-steel | 67° ± 6° | 82° ± 2° | 82° ± 3° | 84° ± 2° |
| Nickel | 80° ± 5° | 82° ± 3° | 86° ± 1° | 86° ± 1° |
| Ruby | 62° ± 2° | 86° ± 2° | 82° ± 1° | nr |

On these materials, the results of the contact angle measurements with the oil Moebius 941 after treatment are comparable for all solutions.

On the other hand, the protocol in isopropyl alcohol takes about 15 minutes while the treatment time in HFO Vertrel Suprion, HFE-7200 or HCF-365mfc+IPA is 1 minute. The very large time savings results in particular from the fact that the present invention advantageously employs a single dipping bath, whereas in the case of use of fluorinated bisphosphonate compounds in isopropyl alcohol, four dipping baths are necessary.

Furthermore, the concentration of molecule C used for the solution in isopropyl alcohol is 10 times higher than that in fluorinated solvents.

Example 6: Comparison of a Treatment with Compound C Solubilised in Isopropyl Alcohol with Treatments with Compound C Solubilised in Various Fluorinated Solvents at Equal Concentrations Nickel-plated, gold-plated, rhodium-plated, 20AP steel and 316L stainless-steel parts were treated with 0.2 mmol/L solutions of compound C in HFO Vertrel Suprion or in solution in isopropyl alcohol at 0.2 mmol/L. The parts were immersed in these two solutions for 30 seconds or 1 hour. Once the parts were dried, the contact angles were measured with a watch oil and with hexadecane.

|  | Isopropyl alcohol | | HFO Vertrel Suprion | |
|---|---|---|---|---|
| Dipping time | 0.5 min | 60 min | 0.5 min | 60 min |
| CA Oil |  |  |  |  |
| Gold-plated brass | 63° ± 15° | 66° ± 1° | 81° ± 0° | 82° ± 0° |
| Rhodium-plated brass | 62° ± 11° | 54° ± 6° | 82° ± 0° | 82° ± 1° |
| 316L stainless-steel | 45° ± 2° | 59° ± 1° | 81° ± 1° | 79° ± 1° |
| Nickel | 56° ± 1° | 66° ± 1° | 82° ± 0° | 81° ± 0° |
| CA Hexadecane |  |  |  |  |
| Gold-plated brass | 61° ± 10° | 70° ± 2° | 76° ± 1° | 76° ± 0° |
| Rhodium-plated brass | 49° ± 13° | 48° ± 6° | 76° ± 0° | 76° ± 0° |
| 316L stainless-steel | 34° ± 1° | 49° ± 1° | 75° ± 0° | 78° ± 1° |
| Nickel | 43° ± 3° | 58° ± 1° | 75° ± 1° | 77° ± 1° |

These results show that the CAs obtained on the surfaces treated with molecule C dissolved in a fluorinated solvent are, in all cases, significantly higher than those obtained with the same molecule dissolved in IPA, under identical conditions of concentration and of dipping time.

The contact angles obtained for the materials coated with the solution in IPA vary according to the dipping time and the material used.

The contact angles obtained for materials coated with the solution in HFO are independent of dipping time. Their variability is low. The surface coating with the HFO solution is more robust and performs better than the one using the solution in IPA.

Example 7: Influence of the Concentration of the Treating Solution when the Molecule is Dissolved in a Fluorinated Solvent 7-a Solution in HFO Vertrel Suprion Gold-plated brass, rhodium-plated brass, nickel and 316L stainless-steel parts were treated by immersion for 30 seconds with molecule C in solution in the solvent HFO Vertrel Suprion at three concentrations: 0.2 mM, 0.4 mM and 1 mM. The contact angles with a watch oil were measured after treatment.

| CA Oil | Total concentration of molecule C | | |
|---|---|---|---|
| | 0.2 mM | 0.4 mM | 1 mM |
| Gold-plated brass | 85° ± 1° | 85° ± 1° | 92° ± 2° |
| Rhodium-plated brass | 86° ± 0° | 84° ± 0° | 92° ± 1° |
| Ni | 83° ± 1° | 86° ± 1° | 78° ± 1° |
| 316L stainless-steel | 80° ± 1° | 84° ± 0° | 86° ± 1° |

Regardless of the concentration tested, the treated parts have a very marked oleophobic character.

7-b Solution in a Mixture of Alcohol and HFC-365Mfc 316L stainless-steel parts were treated by immersion for 30 seconds in a solution of molecule C in a mixture of alcohol and HFC-365mfc at 0.2 mM and at 2 mM. The contact angles (CAs) with a watch oil and with hexadecane were measured after treatment.

| | Total concentration of molecule C | |
|---|---|---|
| | 0.2 mM | 2 mM |
| CA watch oil | 82° ± 0° | 91° ± 1° |
| CA hexadecane | 73° ± 4° | 78° ± 2° |

For both concentrations, the treated parts have little affinity with an oil or a hydrocarbon such as hexadecane.

Example 8: Resistance to Washing with Isopropyl Alcohol

Nickel-plated, gold-plated brass, rhodium-plated brass, 20AP steel and 316L stainless-steel parts were treated with compound C according to the protocol of example 2.a. These parts were subjected to 5 isopropyl alcohol wash cycles. Each cycle is composed as follows:
  Two minutes of immersion in an isopropyl alcohol bath in the presence of ultrasound, (2 repetitions)
  Two minutes of immersion in a new isopropyl alcohol bath without ultrasound (2 repetitions)
The contact angles (CAs) with the watch oil at the end of the 5 cycles are measured after treatment with the solution of molecule C and then after washing the same parts.

| | CA after treatment with molecule C | CA after 5 cleaning cycles with isopropyl alcohol |
|---|---|---|
| Gold | 90° ± 3° | 83° ± 6° |
| Rhodium | 71° ± 4° | 66° ± 5° |
| Nickel | 85° ± 1° | 77° ± 3° |
| 316L stainless-steel | 81° ± 2° | 69° ± 3° |
| 20AP steel | 78° ± 3° | 76° ± 3° |

The results show that the treatment with the gem-bisphosphonic compounds is stable on all materials tested after 5 isopropyl alcohol wash cycles.

Example 9: Resistance after Aqueous-Phase Detergent Washing

Nickel-plated, gold-plated brass, rhodium-plated brass, 20AP steel and 316L stainless-steel parts were treated with compound C according to the protocol of example 2.a. These parts underwent a cycle of aqueous-phase detergent washing consisting of the following steps:
  Three minutes in a 5% aqueous-phase detergent bath at 60° C. in the presence of ultrasound
  Three minutes in a 4% aqueous-phase detergent bath at 60° C. in the presence of ultrasound
  Two minutes in a hard-water bath at room temperature
  Three minutes in a 3% aqueous-phase detergent bath at 60° C. in the presence of ultrasound
  Rinsing and drying the parts
The contact angles (CAs) with the watch oil are measured after treatment with molecule C and then at the end of the cleaning cycle.

| | CA after treatment | CA after a detergent cleaning cycle |
|---|---|---|
| Gold-plated brass | 83° ± 5° | 46° ± 11° |
| Rhodium-plated brass | 66° ± 5° | 51° ± 17° |
| Nickel | 81° ± 2° | 71° ± 5° |
| 316L stainless-steel | 83° ± 2° | 73° ± 1° |
| 20AP steel | 83° ± 2° | 66° ± 7° |

Despite a decrease in the contact angles, the materials still have a marked oleophobic character since the angles are higher than 45°, the lower limit for the lipophobic property deemed acceptable by persons skilled in the art.

Example 10: Resistance after Washing with Benzene

Nickel-plated, gold-plated brass, rhodium-plated brass, 20AP steel and 316L stainless-steel parts, and rubies were treated with compound C according to the protocol of example 2.a. These parts were subjected to 5 wash cycles with rectified benzene (petroleum ether).
Each cycle is composed as follows:
  Immerse the parts in the rectified benzene solution for 2 min with ultrasound.
  Immerse the parts in a new rectified benzene solution for 2 min at room temperature.
  Dry the parts under a stream of cold air.
The contact angles (CAs) with the watch oil are measured after treatment with molecule C and then at the end of the 5 cleaning cycles.

| | CA after treatment | CA after 5 cleaning cycles with rectified benzene |
|---|---|---|
| Gold-plated brass | 85° ± 1° | 74° ± 1° |
| Rhodium-plated brass | 84° ± 2° | 71° ± 2° |
| Nickel | 85° ± 1° | 72° ± 4° |
| 316L stainless-steel | 83° ± 0° | 70° ± 1° |
| 20AP steel | 71° ± 1° | 64° ± 4° |
| Ruby | 72° ± 3° | 68° ± 3° |

The materials treated with the gem-bisphosphonic compounds in solution in a fluorinated solvent retain their oleophobic properties after 5 cleaning cycles with this hydrocarbon.

Example 11: Resistance after Washing with Pentane

Nickel-plated, gold-plated brass, rhodium-plated brass, 316L stainless-steel and 20AP steel parts, and rubies were treated with compound C according to the protocol of example 2.a. These parts underwent 5 washing cycles with a mixture of pentane isomers.

Each cycle is composed as follows:
Immerse the parts in pentane for 2 min with ultrasound.
Immerse the parts in a new pentane bath for 2 min at room temperature.
Dry the parts under a stream of cold air.

The contact angles (CAs) with the watch oil are measured after treatment with molecule C and then at the end of the 5 cleaning cycles.

|  | CA after treatment | CA after 5 cleaning cycles with pentane |
|---|---|---|
| Gold-plated brass | 84° ± 1° | 78° ± 5° |
| Rhodium-plated brass | 84° ± 1° | 77° ± 2° |
| Nickel | 84° ± 1° | 79° ± 2° |
| 316L stainless-steel | 83° ± 1° | 74° ± 3° |
| 20AP | 82° ± 2° | 71° ± 1° |
| Ruby | 82° ± 1° | 72° ± 3° |

The materials treated with the gem-bisphosphonic compounds in solution in a fluorinated solvent retain their oleophobic properties after 5 cleaning cycles with this hydrocarbon.

Example 12: Treatment of Plastics with a PFPE Gem-Bisphosphonic Compound by Immersion Plastic parts made of PU (polyurethane), POM (polyoxymethylene), PMMA (polymethylmethacrylate) and PC (polycarbonate) were cleaned with isopropyl alcohol. They were then treated with a 0.2 mmol/L solution of compound C in the solvent HFE-7200. Other parts were also treated with a 0.2 mmol/L solution of compound C in isopropyl alcohol.

For all these materials, the parts are immersed for 30 seconds in these solutions and then dried in open air.

Surface modification was evaluated by measuring the contact angle (CA) of a drop of watch oil or of hexadecane.

|  | CA before treatment | CA after treatment with the solvent IPA | CA after treatment with the solvent HFE-7200 |
|---|---|---|---|
| CA watch oil |  |  |  |
| PU | 17° | 50° ± 7° | 81° ± 1° |
| POM | 25° | 48° ± 5° | 74° ± 4° |
| PMMA | 8° | 36° ± 16° | 70° ± 7° |
| PC | 8° | 33° ± 7 | 80° ± 1° |
| CA hexadecane |  |  |  |
| PU | 7° | 53° ± 1° | 69° ± 4° |
| POM | <10° | 40° ± 4° | 72° ± 2° |
| PMMA | 17° | 45° ± 3° | 71° ± 2° |
| PC | 10° | 49° ± 2° | 73° ± 1° |

The contact angles with the oil or the hexadecane are substantially higher on the plastics treated with molecule C in HFE-7200 than those on the plastics treated with molecule C in isopropyl alcohol.

All the plastics treated with the gem-bisphosphonic compounds in solution in HFE-7200 have marked oleophobic properties and a low affinity for hydrocarbons.

Nevertheless, the chemical compatibility of certain fluorinated solvents makes the treatment of certain polymeric materials delicate. The skilled person should choose a fluorinated solvent compatible with the material so that it does not cause the degradation of this material during its treatment with a composition containing a bisphosphonic compound.

Example 13: Spray Treatment of Plastics with a PFPE Bisphosphonic Compound

Plastic parts made of ABS, nylon, PU, POM, PMMA, PC, PET, plastoferrite and PBT (polybutylene terephtalate) were cleaned with isopropyl alcohol. The parts were treated with a 0.2 mmol/L solution of compound C in the solvent HFE-7200 or in mixture of the fluorinated solvent HFC-365mfc and isopropyl alcohol in a volume ratio of 99:1. These solutions were sprayed on the parts using a vertical sprayer. The samples are dried in open air.

Surface modification was evaluated by measuring the contact angle (CA) of a drop of watch oil and of hexadecane.

|  | CA before treatment | CA after treatment with the solvent HFC-IPA | CA after treatment with the solvent HFE |
|---|---|---|---|
| CA watch oil |  |  |  |
| ABS | <5° | 63° ± 7° | 83° ± 1° |
| Nylon | 15° | 62° ± 6° | 80° ± 3° |
| PU | 14° | 67° ± 5° | 83° ± 1° |
| POM | 22° | 53° ± 5° | 73° ± 2° |
| PMMA | 8° | nr | 68° ± 3° |
| PC | 8° | nr | 56° ± 7° |
| CA hexadecane |  |  |  |
| ABS | 18° | 58° ± 4° | 76° ± 1° |
| Nylon | 15° | 66° ± 4° | 74° ± 1° |
| PU | 7° | 59° ± 2° | 74° ± 1° |
| POM | <10° | 51° ± 4° | 75° ± 3° |
| PMMA | 8° | nr | 70° ± 2° |
| PC | 8° | nr | 73° ± 2° |
| PET | 8° | nr | 76° ± 1° |
| Plastoferrite | <5° | nr | 72° ± 2° |
| PBT | 3° | nr | 73° ± 4° |

In a way similar to example 12, the treatment with molecule C in solution in HFE-7200 and, to a lesser extent, in solution in the solvent HFC+IPA made the plastics tested oleophobic: the surfaces thus treated have a low affinity for hydrocarbons and oils.

The contact angles on the plastics treated with molecule C in solution in the fluorinated solvents are higher than those on the plastics treated with molecule C in isopropyl alcohol (data not provided).

Example 14: Spray Treatment of Metals

In order to be able to treat parts by high-speed spraying under industrial conditions, it is useful to have a solution that is non-flammable and relatively volatile.

On 316L stainless-steel and gold parts in the vertical position, solutions of compound C (0.2 mM) dissolved in an azeotrope of HFC-365mfc in mixture with an alcohol, or in the solvent HFE-7200, were sprayed on the samples with a paint gun.

Surface modification was evaluated by measuring the contact angle (CA) of drops of water and of hexadecane.

|  | Before treatment | After treatment with the solvent HFC + IPA | After treatment with the solvent HFE |
|---|---|---|---|
| CA H$_2$O | | | |
| 316L stainless-steel | 64° ± 2° | 100° ± 2° | 107° ± 1° |
| Gold | 50° ± 12° | 88° ± 6° | 93° ± 0° |
| CA Hexadecane | | | |
| 316L stainless-steel | <5° | 82° ± 1° | 73° ± 2° |
| Gold | 6° ± 6° | 75° ± 3° | 74° ± 3° |

The hydrophobic, lipophobic and anti-hydrocarbon character of the surfaces is increased by the deposition of molecule C dissolved in a fluorinated solvent.

Example 15: Comparison of the Application Processes as a Function of the Materials and Formulations Used 316L stainless-steel, plastoferrite and polyethylene terephthalate (PET) parts were cleaned with isopropyl alcohol.
Solutions of compound C (0.2 mM) were prepared either in an azeotrope of HFC-365mfc in mixture with an alcohol, in the solvent HFO Vertrel Suprion, or in the solvent HFE-7200.
These solutions were then either:
Sprayed on the samples from a distance of 10 cm from the surface, in the vertical position, followed by drying in open air.
Applied by coating with a brush, followed by drying in open air.
Applied by dipping according to the protocol described in example 2.
Surface modification was evaluated by measuring the contact angle (CA) of drops of watch oil and of hexadecane.

| CA watch oil | | Before coating | After spray coating | After brush coating | After dipping treatment |
|---|---|---|---|---|---|
| HFC-365mfc + IPA | 316L stainless-steel | 8° | 82° | 79° | 79° |
|  | plastoferrite | 54° | 91° | 84° | 84° |
|  | PET | 20° | 71° | 54° | 83° |
| HFO Vertrel Suprion | 316L stainless-steel | 8° | 77° | 77° | 84° |
|  | plastoferrite | 56° | 95° | 95° | 91° |
|  | PET | 20° | 80° | 78° | 78° |
| HFE-7200 | 316L stainless-steel | 8° | 82° | 80° | 84° |
|  | plastoferrite | 56° | 98° | 95° | 97° |
|  | PET | 20° | 75° | 77° | 80° |

The standard deviations are less than or equal to 5°

| CA hexadecane | | Before coating | After spray coating | After brush coating | After dipping treatment |
|---|---|---|---|---|---|
| HFC-365mfc + IPA | 316L stainless-steel | <5° | 79° | 74° | 70° |
|  | plastoferrite | 30° | 74° | 68° | 68° |
|  | PET | <5° | 68° | 67° | 70° |
| HFO Vertrel Suprion | 316L stainless-steel | <5° | 73° | 69° | 76° |
|  | plastoferrite | 30° | 82° | 76° | 88° |
|  | PET | <5° | 77° | 61° | 75° |
| HFE-7200 | 316L stainless-steel | <5° | 77° | 71° | 76° |
|  | plastoferrite | 36° | 76° | 76° | 80° |
|  | PET | <5° | 69° | 74° | 78° |

The standard deviations are less than or equal to 5°

Regardless of the application method (spraying, coating or dipping) and the fluorinated solvent, the treated parts show a marked lipophobic character as well as a limited affinity for hydrocarbons.

The invention claimed is:

1. A liquid composition containing at least one bisphosphonic compound bearing at least one partially fluorinated, perfluorinated (PF) or perfluoropolyether (PFPE) group, wherein said bisphosphonic compound is dissolved in a nonflammable fluorinated solvent or in a mixture of nonflammable fluorinated solvents.

2. The composition of claim 1, wherein said solvent or mixture of solvents contains hydrofluorocarbons (HFCs), hydrofluoro-ethers (HFEs), hydrofluoroolefins (HFOs) and perfluoropolyethers (PFPEs) used alone or in mixture.

3. The composition of claim 1, wherein said solvent is chosen from the group consisting of:
hydrofluoro-($C_{3-6}$) alkanes ($C_{1-4}$) alkoxy perfluoro-($C_{4-8}$) alkanes
$C_3$ to $C_{10}$ hydrofluoroolefins containing a single ethylenic double bond, and
molecules having a $C_2$ to $C_5$ perfluorinated carbon chain interspersed with oxygen atoms.

4. The composition of claim 1, wherein said solvent or mixture of solvents also contains non-fluorinated solvents.

5. The composition of claim 1, wherein said solvent or mixture of solvents does not have a flash point.

6. The composition of claim 1, wherein said solvent or mixture of solvents is in the form of a quasi-azeotropic or azeotropic mixture.

7. The composition of claim 1, wherein said bisphosphonic compound has the following structural formula:

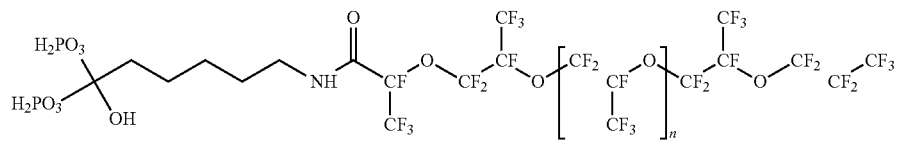

wherein n=1 or n=2.

8. The composition of claim 1, wherein said bisphosphonic compound is present at a molar concentration comprised between 0.01 and 50 mmol/L.

9. A method for increasing the lipophobic or the hydrophobic properties of a surface, in order to limit the spreading of lubricants, hydrocarbons or aqueous solutions on said surface, said method comprising the step of applying the liquid compositions as defined in claim 1 on said surface.

10. The method of claim 9, comprising the following successive steps:
   a) if necessary, preliminary oxidation of the surface,
   b) contacting the surface with the liquid composition as defined claim 1, until the bisphosphonic compounds contained therein is assembled in a layer coating said surface,
   c) drying the surface thus coated.

11. The method of claim 9, wherein said liquid composition is coated on said surface by spraying, centrifugal coating, wiping, dipping, dip coating, flow coating, laminar coating.

12. The method of claim 9, wherein the contacting of said liquid composition with the said surface is carried out by spraying a part of said surface with or dipping a part of said surface in said liquid composition, containing between 0.001% and 5% bisphosphonic compounds, for a time comprised between 1 second and 2 minutes, at room temperature.

13. The method of claim 10, wherein an additional rinsing step is carried out by spraying with or dipping in a solvent between step b) and step c).

14. The method of claim 9, wherein said surface is made of metallic material, is made of iron, titanium, copper, aluminium, nickel, tin or of an alloy of these metals, of steel, stainless steel, carbon steel, brass, copper-nickel-zinc, bronze, tin-nickel, nickel-phosphorus, beryllium copper, of glass, silicon, ruby, or sapphire, of gold, silver, or rhodium.

15. The method of claim 9, wherein said surface is made of composite material and/or of thermoplastic or thermosetting polymers, or of plastoferrite.

16. The method of claim 9, wherein said surface is a part of a mechanism or device integrated in a watch piece, in a micromechanical or mechatronic object, in a medical device, in a printed circuit, in an electronic board, in a microelectronic connector, in a micro- or macrofluidic system, in an optical or optronic system, or in a measuring instrument.

* * * * *